United States Patent
Wang et al.

(10) Patent No.: US 10,079,770 B2
(45) Date of Patent: Sep. 18, 2018

(54) JUNK INFORMATION FILTERING METHOD AND APPARATUS

(71) Applicant: Huawei Technologies Co., Ltd., Shenzhen, Guangdong (CN)

(72) Inventors: Shuqiang Wang, Shenzhen (CN); Lujia Pan, Shenzhen (CN); Cheng He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 480 days.

(21) Appl. No.: 14/836,642

(22) Filed: Aug. 26, 2015

(65) Prior Publication Data

US 2015/0365334 A1    Dec. 17, 2015

Related U.S. Application Data

(63) Continuation of application No. PCT/CN2014/082661, filed on Jul. 22, 2014.

(30) Foreign Application Priority Data

Jul. 31, 2013    (CN) .......................... 2013 1 0327247

(51) Int. Cl.
*G06F 15/16* (2006.01)
*H04L 12/823* (2013.01)
(Continued)

(52) U.S. Cl.
CPC .............. *H04L 47/32* (2013.01); *H04L 67/02* (2013.01); *H04L 67/42* (2013.01); *H04L 69/22* (2013.01)

(58) Field of Classification Search
CPC ..... H04L 67/02; H04L 67/10; H04L 67/2823; H04L 47/32; H04L 67/42; H04L 69/22; G06N 5/02; G06N 7/005
See application file for complete search history.

(56) References Cited

U.S. PATENT DOCUMENTS

| | | | |
|---|---|---|---|
| 2007/0028185 A1* | 2/2007 | Bhogal | G06F 17/30899 715/808 |
| 2009/0063284 A1* | 3/2009 | Turpin | G06Q 30/02 705/14.61 |

(Continued)

FOREIGN PATENT DOCUMENTS

| | | |
|---|---|---|
| CN | 101257461 A | 9/2008 |
| CN | 102799643 A | 11/2012 |

(Continued)

OTHER PUBLICATIONS

Hu, Xia, et al., "A self-feedback synthesis method for spam filtering," CAAI Transactions on Intelligent Systems, vol. 5, No. 2, Apr. 2010, 6 pages.

(Continued)

*Primary Examiner* — Zarni Maung (57) ABSTRACT

A junk information filtering method, including: detecting an Hypertext Transfer Protocol (HTTP) request data packet set generated according to that a user visits a target uniform resource locator (URL) by using a browser of a client, where the HTTP request data packet set includes at least one junk information request data packet and at least one non-junk information request data packet; identifying the junk information request data packet in the HTTP request data packet set according to a preset classification rule; and preventing, according to a preset interception policy, a destination host corresponding to the junk information request data packet from returning a junk information response data packet to the client. The embodiments of the present invention further disclose a junk information filtering apparatus. According to the present invention, accuracy of web page junk information filtering can be improved and user traffic can be saved.

12 Claims, 6 Drawing Sheets (51) Int. Cl.
*H04L 29/06* (2006.01)
*H04L 29/08* (2006.01)
*G06F 12/00* (2006.01)

(56) References Cited

U.S. PATENT DOCUMENTS

| | | |
|---|---|---|
| 2010/0216458 A1 | 8/2010 | Cai et al. |
| 2012/0016744 A1* | 1/2012 | Barry .................... G06Q 30/02 705/14.49 |
| 2012/0089482 A1 | 4/2012 | Patel |
| 2014/0223286 A1* | 8/2014 | Lin .................... G06F 17/3012 715/234 |

FOREIGN PATENT DOCUMENTS

| | | |
|---|---|---|
| CN | 102801697 A | 11/2012 |
| CN | 103186739 A | 7/2013 |
| EP | 2 566 179 A1 | 3/2013 |

OTHER PUBLICATIONS

Fabian Schneider, et al., "Understanding Online Social Network Usage from a Network Perspective", Internet Measurement Conference 2009, 21 pages.

\* cited by examiner

JUNK INFORMATION FILTERING METHOD AND APPARATUS

CROSS-REFERENCE TO RELATED APPLICATIONS

This application is a continuation of International Application No. PCT/CN2014/082661, filed on Jul. 22, 2014, which claims priority to Chinese Patent Application No. 201310327247.X, filed on Jul. 31, 2013, both of which are hereby incorporated by reference in their entireties.

TECHNICAL FIELD

The present invention relates to the network field, and in particular, to a junk information filtering method and apparatus.

BACKGROUND

As modern web pages are becoming increasingly complex, after a user clicks a link to send a visit request, in addition to an Hypertext Transfer Protocol (HTTP) request data packet required by a user, a lot of unrelated junk information request data packets, such as an advertisement request, are generated. The advertisement request wastes effective user traffic, occupies software and hardware resources of a user client, and has great impact on web page browsing of the user.

As advertising revenue is an important income source of a website, advertisement positions are continuously added on a web page to increase website revenue. Frequent pop-up of an advertisement window during web page browsing of a user not only seriously affects a network access speed of the user, but also occupies network bandwidth. Forms of existing web page advertisements are mainly classified into: a pop-up window advertisement, a floating image advertisement, and a Flash advertisement. In the prior art, a web page advertisement interception manner is mainly implemented by using a built-in advertisement interception function of a browser of a client, for example, a common web page advertisement is intercepted according to a characteristic of the advertisement, such as a size and a position.

The inventor finds that a web page interception method in the prior art has the following problems:

1. When interception is performed according to a characteristic of a web page, a characteristic of a rapidly-updated web page cannot be updated in a timely manner, resulting in a poor interception effect; and 2. Interception is performed on a client, which wastes effective user traffic.

SUMMARY

A technical problem to be resolved by embodiments of the present invention is to provide a junk information filtering method and apparatus, which can resolve disadvantages of poor junk information interception accuracy and user traffic waste in the prior art.

To resolve the foregoing technical problems, a first aspect of the present invention provides a junk information filtering method, including:

detecting an Hypertext Transfer Protocol (HTTP) request data packet set generated according to that a user visits a target uniform resource locator (URL) by using a browser of a client, where the HTTP request data packet set includes at least one junk information request data packet and at least one non-junk information request data packet;

identifying the junk information request data packet in the HTTP request data packet set according to a preset classification rule; and preventing, according to a preset interception policy, a destination host corresponding to the junk information request data packet from returning a junk information response data packet to the client.

With reference to the first aspect, in a first possible implementation manner, the step of identifying the junk information request data packet in the request information data packet set according to a preset classification rule includes:

extracting header information of a to-be-identified HTTP request data packet in the HTTP request data packet set, where the header information includes a timestamp of the HTTP request data packet, a size of the HTTP request data packet, and a Referer field of the HTTP request data packet; and if it is determined, according to the header information, that the to-be-identified HTTP request data packet meets the preset classification rule, determining that the to-be-identified HTTP request data packet is the junk information request data packet, where the preset classification rule includes that:

a time interval between the timestamp of the to-be-identified HTTP request data packet and a timestamp of the first HTTP request data packet is shorter than a preset duration; and/or the Referer field of the to-be-identified HTTP request data packet includes one or more of ad, widget, embed, banner, and blog; and/or the size of the to-be-identified HTTP request data packet is larger than a preset size.

With reference to the first aspect, in a second possible implementation manner, the step of identifying the junk information request data packet in the request information data packet set according to a preset classification rule includes:

computing, according to a preset keyword extraction algorithm, a first keyword vector representing content of a to-be-identified HTTP request data packet in the HTTP request data packet set;

computing similarity between the first keyword vector and a second keyword vector that is generated according to a historical junk information request data packet of the user; and if a value of the similarity is less than a preset value, determining that the to-be-identified HTTP request data packet is the junk information request data packet.

With reference to any one of the first aspect to the second possible implementation manner, in a third possible implementation manner, before the step of detecting an Hypertext Transfer Protocol (HTTP) request data packet set generated according to that a user visits a target uniform resource locator (URL) by using a browser of a client, the method includes:

detecting a training data packet that is sent by the client and carries junk information content, and generating, by learning the training data packet, the classification rule used to identify a junk information request data packet.

With reference to the third possible implementation manner of the first aspect, in a fourth possible implementation manner, the step of identifying the junk information request data packet in the HTTP request data packet set according to a preset classification rule includes:

identifying the non-junk information request data packet in the HTTP request data packet set, and segregating the junk information request data packet from the HTTP request data packet set according to the non-junk information request data packet.

With reference to the fourth possible implementation manner of the first aspect, in a fifth possible implementation manner, the step of identifying the non-junk information request data packet in the HTTP request data packet set includes:

capturing a corresponding HTTP response data packet from a destination host corresponding to an HTTP request data packet in the HTTP request data packet set;

extracting first header information of the HTTP request data packet and second header information of the HTTP response data packet, where the first header information includes a timestamp of the HTTP request data packet, a Referer field of the HTTP request data packet, and a size of the data packet; and the second header information includes a Content-type field of the HTTP response data packet and a quantity of objects included in a web page file; and identifying the non-junk information request data packet in the HTTP request data packet set according to the first header information and the second header information.

With reference to any one of the first aspect to the fifth possible implementation manner, in a sixth possible implementation manner, the step of preventing, according to a preset interception policy, a destination host corresponding to the junk information request data packet from returning a junk information response data packet to the client includes:

if traffic consumed by the user is larger than preset traffic and/or a priority of the user is higher than a preset priority, intercepting the junk information response data packet returned to the client by the destination host corresponding to the junk information request data packet.

A second aspect of the present invention provides a junk information filtering apparatus, including:

a detecting module, configured to detect an Hypertext Transfer Protocol (HTTP) request data packet set generated according to that a user visits a target uniform resource locator (URL) by using a browser of a client, where the HTTP request data packet set includes at least one junk information request data packet and at least one non-junk information request data packet;

an identifying module, configured to identify the junk information request data packet in the HTTP request data packet set according to a preset classification rule; and an intercepting module, configured to prevent, according to a preset interception policy, a destination host corresponding to the junk information request data packet from returning a junk information response data packet to the client.

With reference to the second aspect, in a first possible implementation manner, the identifying module includes:

a first extracting unit, configured to extract header information of a to-be-identified HTTP request data packet in the HTTP request data packet set, where the header information includes a timestamp of the HTTP request data packet, a size of the HTTP request data packet, and a Referer field of the HTTP request data packet; and a first identifying unit, configured to: if it is determined, according to the header information, that the to-be-identified HTTP request data packet meets the preset classification rule, determine that the to-be-identified HTTP request data packet is the junk information request data packet, where the preset classification rule includes that:

a time interval between the timestamp of the to-be-identified HTTP request data packet and a timestamp of the first HTTP request data packet is shorter than a preset duration; and/or the Referer field of the to-be-identified HTTP request data packet includes one or more of ad, widget, embed, banner, and blog; and/or the size of the to-be-identified HTTP request data packet is larger than a preset size.

With reference to the second aspect, in a second possible implementation manner, the identifying module includes:

a keyword extracting unit, configured to compute, according to a preset keyword extraction algorithm, a first keyword vector representing content of a to-be-identified HTTP request data packet in the HTTP request data packet set;

similarity computing unit, configured to compute similarity between the first keyword vector and a second keyword vector that is generated according to a historical junk information request data packet of the user; and a determining unit, configured to: if a value of the similarity is less than a preset value, determine that the to-be-identified HTTP request data packet is the junk information request data packet.

With reference to the second aspect to the second possible implementation manner, in a third possible implementation manner, the apparatus further includes:

a learning module, configured to: receive a training data packet that is sent by the client and carries junk information content, and generate, by learning the training data packet, the classification rule used to identify a junk information request data packet.

With reference to the second aspect, in a fourth possible implementation manner, the identifying module is configured to: identify the non-junk information request data packet in the HTTP request data packet set, and segregate the junk information request data packet from the HTTP request data packet set according to the non-junk information request data packet.

With reference to the fourth possible implementation manner of the second aspect, in a fifth possible implementation manner, the identifying module includes:

a capturing unit, configured to capture a corresponding HTTP response data packet from a destination host corresponding to an HTTP request data packet in the HTTP request data packet set;

a second extracting unit, configured to extract first header information of the HTTP request data packet and second header information of the HTTP response data packet, where the first header information includes a timestamp of the HTTP request data packet, a Referer field of the HTTP request data packet, and a size of the data packet; and the second header information includes a Content-type field of the HTTP response data packet and a quantity of objects included in a web page file; and a second identifying unit, configured to identify the non-junk information request data packet in the HTTP request data packet set according to the first header information and the second header information.

With reference to any one of the second aspect to the fifth possible implementation manner, in a sixth possible implementation manner, the intercepting module is configured to: if traffic consumed by the user is larger than preset traffic and/or a priority of the user is higher than a preset priority, intercept the junk information response data packet returned to the client by the destination host corresponding to the junk information request data packet.

Implementing the present invention has the following beneficial effects:

A junk information request data packet in an HTTP request data packet set generated by a client is identified according to a preset rule; and a destination host corresponding to the identified junk information request data packet is prevented from returning a junk information response data packet to the client. A junk information request is identified at a data packet level, which can identify and intercept the junk information request more accurately, and prevent a junk information response from being generated by the junk information request and sent to the client, thereby effectively saving user traffic.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
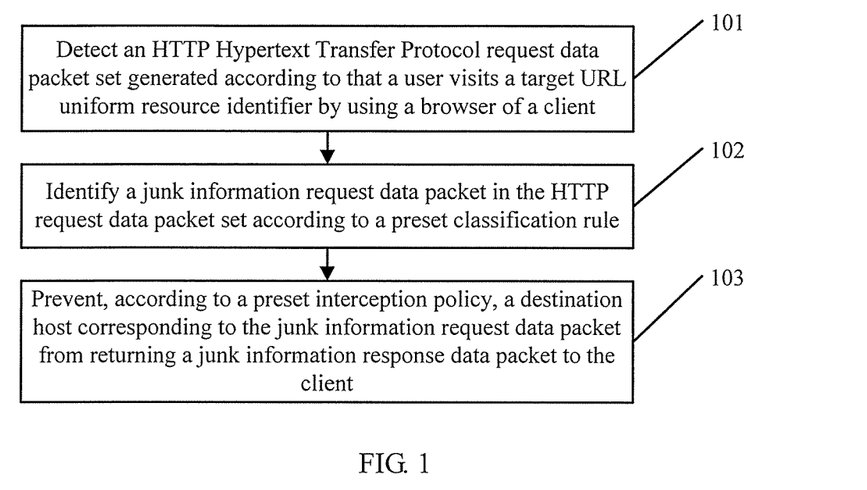
FIG. 1 is a schematic flowchart of a junk information filtering method according to an embodiment of the present invention.

Referring to FIG. 1, FIG. 1 is a schematic flowchart of a junk information filtering method according to an embodiment of the present invention. The method includes:

Step 101. Detect an HTTP request data packet set generated according to that a user visits a target uniform resource locator (URL) by using a browser of a client.

Specifically, the user clicks the target URL on a web page displayed on the browser of the client, or directly enters the target URL in an address bar of the browser, and the client generates, at a time, the HTTP request data packet set that includes several data packets, where the HTTP request data packet set includes at least one junk information request data packet and at least one non-junk information request data packet, an HTTP request data packet sent to a destination host corresponding to the target URL is the non-junk information request data packet, and an HTTP request data packet sent to a destination host used to push junk information content is the junk information request data packet. The junk information request data packet is data generated from a non-mandatory request of the user, such as an advertisement information request data packet. For example, the user clicks a target URL "cnn.com", and the client generates an HTTP request data packet set, where the HTTP request data packet set includes a non-junk information request data packet sent to a destination host corresponding to the target URL cnn.com, and also includes a junk information request data packet sent to a host corresponding to "ads.cnn.com/id=210", a junk information request data packet sent to a host corresponding to "Google-analy/utm.gif", and a junk information request data packet sent to a junk information server corresponding to "ad.doubleclick.net/moij".

In this embodiment of the present invention, a junk information filtering apparatus is deployed between the client and a web page server or between the client and a junk information server; for example, the junk information filtering apparatus is deployed in a server of a carrier providing a network access server. The junk information filtering apparatus caches and parses the HTTP request data packet set sent by the client and an HTTP response data packet set responded by the web page server.

Step 102. Identify a junk information request data packet in the HTTP request data packet set according to a preset classification rule.

Specifically, the junk information filtering apparatus parses header information of each to-be-identified HTTP request data packet in the HTTP request data packet set, where the header information includes a timestamp of the HTTP request data packet, a Referer field of the HTTP request data packet, and a size of the HTTP request data packet; performs a comparison according to the header information and the preset classification rule; and if the header information of the to-be-identified HTTP request data packet meets the preset classification rule, determines that the to-be-identified HTTP request data packet is the junk information request data packet. Specific implementation is that a classification rule can be implemented by using a regular expression, where a classification condition based on a related parameter of header information is set in the regular expression; and whether a to-be-identified HTTP request data packet is a junk information request data packet is determined by determining whether header information of the to-be-identified HTTP request data packet meets the regular expression.

Step 103. Prevent, according to a preset interception policy, a destination host corresponding to the junk information request data packet from returning a junk information response data packet to the client.

Specifically, the filtering apparatus identifies the junk information request data packet in the HTTP request data packet set, analyses a Host field in the junk information request data packet, and prevents, according to the preset interception policy, the host corresponding to the Host field from returning the responded junk information response data packet to the client. Information, such as a priority of the user and network traffic consumed by the user, may be taken into consideration in the preset interception policy; and real-time interception is performed only on a high-priority user and/or a user consuming relatively large network traffic.

In this embodiment of the present invention, the filtering apparatus may further acquire a hardware resource consumption value of the client; for example, the hardware resource consumption value includes CPU usage and memory usage. When the hardware resource consumption value of the client is greater than a specified value, the filtering apparatus performs interception; otherwise, the filtering apparatus performs no interception.

According to this embodiment of the present invention, a junk information request data packet in an HTTP request data packet set generated by a client is identified according to a preset rule; and a destination host corresponding to the identified junk information request data packet is prevented from returning a junk information response data packet to the client. A junk information request is identified at a data packet level, which can identify and intercept the junk information request more accurately, and prevent a junk information response from being generated by the junk information request and sent to the client, thereby effectively saving user traffic.

Figure 2:
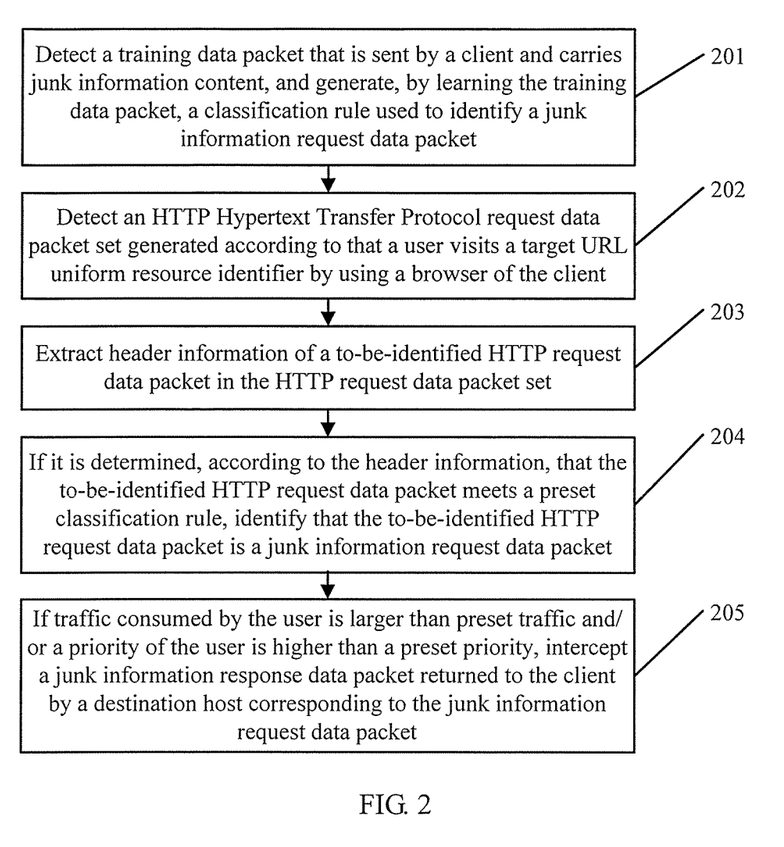
FIG. 2 is another schematic flowchart of a junk information filtering method according to an embodiment of the present invention.

Referring to FIG. 2, FIG. 2 is another schematic flowchart of a junk information filtering method according to an embodiment of the present invention. The method includes:

Step 201. Receive a training data packet that is sent by a client and carries junk information content, and generate, by learning the training data packet, a classification rule used to identify a junk information request data packet.

Specifically, a filtering apparatus receives a predetermined quantity of training data packets that are sent by the client and carry junk information content; and the filtering apparatus parses header information of the training data packets to separately obtain header information of each training data packet, and collects statistics on header information of each training data packet to obtain the classification rule used to identify a junk information request data packet.

For example, the filtering apparatus receives 100 training data packets that are sent by the client and carry junk information content; parses header information of each training data packet to obtain three groups of data, where the header information includes a size of the data packet, a timestamp of the data packet, and a Referer field of the data packet, and each group of data includes 100 elements; and determines a classification rule for a junk information request data packet according to a statistical regularity of each group of the data.

For determining of a screening condition for a size of a data packet, statistics are collected on a value range of sizes of the 100 training data packets; and when a size of a to-be-identified HTTP request data packet is beyond the value range, the to-be-identified HTTP request data packet may be a junk information request data packet.

For determining of a screening condition for a timestamp of a data packet, a time difference between a timestamp of each training data packet and a timestamp of the first training data packet is calculated to obtain a value range of the time differences; and when a time difference between a timestamp of a to-be-identified HTTP request data packet and a timestamp of the first HTTP request data packet is beyond the value range, the to-be-identified HTTP request data packet may be a junk information request data packet.

For determining of a screening condition for a Referer field of a data packet, statistics are collected on frequencies of keywords appearing in all data packets of the 100 training data packets, all the keywords are arranged in descending order of the appearance frequencies, and first several keywords are used as screening keywords; and when the screening keywords appear in a to-be-identified HTTP request data packet, the to-be-identified HTTP request data packet may be a junk information request data packet.

The foregoing three screening conditions are used as the classification rule for identifying a junk information request data packet. a to-be-identified HTTP request data packet can be determined as a junk information request data packet only when header information of the to-be-identified HTTP request data packet meets all the foregoing three screening conditions.

In this embodiment of the present invention, the client sends a training data packet to the filtering apparatus at a predetermined time period, so that the filtering apparatus updates the classification rule to improve accuracy of identifying a junk information request data packet.

Step 202. Detect an HTTP request data packet set generated according to that a user visits a target uniform resource locator (URL) by using a browser of the client.

Specifically, the user clicks the target URL on a web page displayed on the browser of the client, or directly enters the target URL in an address bar of the browser, and the client generates, at a time, the HTTP request data packet set that includes several data packets, where the HTTP request data packet set includes at least one junk information request data packet and at least one non-junk information request data packet, an HTTP request data packet sent to a destination host corresponding to the target URL is the non-junk information request data packet, and an HTTP request data packet sent to a destination host used to push junk information content is the junk information request data packet. For example, the user clicks a target URL "cnn.com", and the client generates an HTTP request data packet set, where the HTTP request data packet set includes a non-junk information request data packet sent to a destination host corresponding to the target URL cnn.com, and also includes a junk information request data packet sent to a host corresponding to "ads.cnn.com/id=210", a junk information request data packet sent to a host corresponding to "Google-analy/utm.gif", and a junk information request data packet sent to a junk information server corresponding to "ad.doubleclick.net/moij".

In this embodiment of the present invention, a junk information filtering apparatus is deployed between the client and a web page server or between the client and a junk information server; for example, the junk information filtering apparatus is deployed in a server of a carrier providing a network access server. The junk information filtering apparatus caches and parses the HTTP request data packet set sent by the client and an HTTP response data packet set responded by the web page server.

Step 203. Extract header information of a to-be-identified HTTP request data packet in the HTTP request data packet set.

Specifically, the filtering apparatus extracts the header information of the to-be-identified HTTP request data packet in the HTTP request data packet set, where the header information includes a timestamp of the to-be-identified HTTP request data packet, a size of the to-be-identified HTTP request data packet, and a Referer field of the to-be-identified HTTP request data packet.

Step 204. If it is determined, according to the header information, that the to-be-identified HTTP request data packet meets the preset classification rule, identify that the to-be-identified HTTP request data packet is a junk information request data packet.

Specifically, if determining, according to the header information, that the to-be-identified HTTP request data packet meets the preset classification rule, the filtering apparatus determines that the to-be-identified HTTP request data packet is the junk information request data packet, where the preset classification rule is specifically that: a time interval between the timestamp of the to-be-identified HTTP request data packet and a timestamp of the first HTTP request data packet is shorter than a preset duration; and/or, the Referer field of the to-be-identified HTTP request data packet includes one or more of ad, widget, embed, banner, and blog; and/or, the size of the to-be-identified HTTP request data packet is larger than a preset size.

In this embodiment of the present invention, the filtering apparatus extracts, according to a preset keyword extraction algorithm, a first keyword vector representing content of the to-be-identified HTTP request data packet; compares similarity between the first keyword vector and a second keyword vector that is extracted from a junk information request data packet of historical user data; and calculates a similarity value between the first keyword vector and the second keyword vector by using a cosine algorithm; and if the similarity value is less than a preset value, the to-be-identified HTTP request data packet may be a junk information request data packet.

The filtering apparatus identifies the junk information request data packet in the HTTP request data packet set by using the foregoing four classification dimensions (the size of the data packet, the timestamp of the data packet, the Referer field of the data packet, and the similarity value). More dimensions that a to-be-identified HTTP request data packet meets indicate a greater possibility that the to-be-identified HTTP request data packet is a junk information request data packet. For example, in a scenario of high-level filtering, a to-be-identified HTTP request data packet is regarded as a junk information request data packet only when the to-be-identified HTTP request data packet meets all the four dimensions completely; in a scenario of middle-level filtering, a to-be-identified HTTP request data packet is regarded as a junk information request data packet when the to-be-identified HTTP request data packet meets three dimensions.

Step 205. If traffic consumed by the user is larger than preset traffic and/or a priority of the user is higher than a preset priority, intercept a junk information response data packet returned to the client by a destination host corresponding to the junk information request data packet.

Specifically, the filtering apparatus identifies the junk information request data packet in the HTTP request data packet set, analyses a Host field in the junk information request data packet, and prevents, according to a preset interception policy, the host corresponding to the Host field from returning the responded junk information response data packet to the client. Information, such as the priority of the user and network traffic consumed by the user, may be taken into consideration in the preset interception policy; and real-time interception is performed only on a high-priority user and/or a user consuming relatively large network traffic.

In this embodiment of the present invention, the filtering apparatus may further acquire a hardware resource consumption value of the client; for example, the hardware resource consumption value includes CPU usage and memory usage. When the hardware resource consumption value of the client is greater than a specified value, the filtering apparatus performs interception; otherwise, the filtering apparatus performs no interception.

Figure 3:
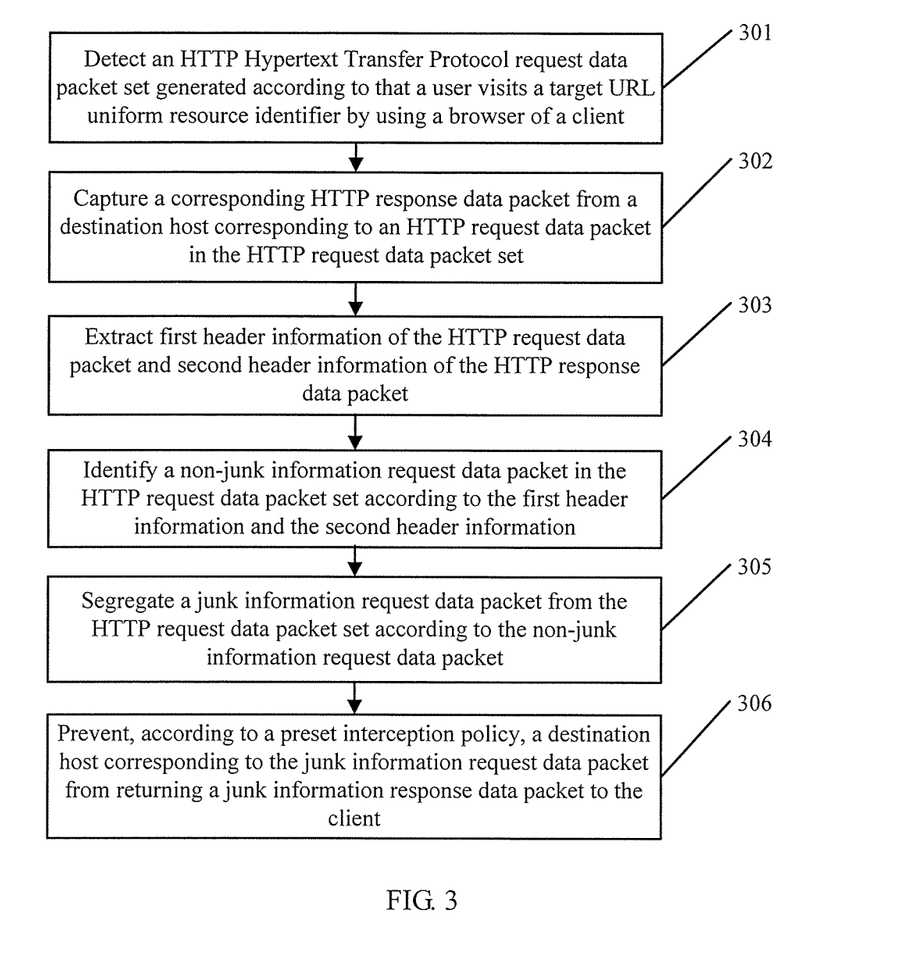
FIG. 3 is still another schematic flowchart of a junk information filtering method according to an embodiment of the present invention.

Referring to FIG. 3, FIG. 3 is still another schematic flowchart of a junk information filtering method according to an embodiment of the present invention. The method includes:

Step 301. Detect an Hypertext Transfer Protocol (HTTP) request data packet set generated according to that a user visits a target uniform resource locator (URL) by using a browser of a client.

Specifically, the user clicks the target URL on a web page displayed on the browser of the client, or directly enters the target URL in an address bar of the browser, and the client generates, at a time, the HTTP request data packet set that includes several data packets, where the HTTP request data packet set includes at least one junk information request data packet and at least one non-junk information request data packet, an HTTP request data packet sent to a destination host corresponding to the target URL is the non-junk information request data packet, and an HTTP request data packet sent to a destination host used to push junk information content is the junk information request data packet. For example, the user clicks a target URL "cnn.com", and the client generates an HTTP request data packet set, where the HTTP request data packet set includes a non-junk information request data packet sent to a destination host corresponding to the target URL cnn.com, and also includes a junk information request data packet sent to a host corresponding to "ads.cnn.com/id=210", a junk information request data packet sent to a host corresponding to "Google-analy/utm.gif", and a junk information request data packet sent to a junk information server corresponding to "ad.doubleclick.net/moij".

In this embodiment of the present invention, a junk information filtering apparatus is deployed between the client and a web page server or between the client and a junk information server; for example, the junk information filtering apparatus is deployed in a server of a carrier providing a network access server. The junk information filtering apparatus caches and parses the HTTP request data packet set sent by the client and an HTTP response data packet set responded by the web page server.

Step 302. Capture a corresponding HTTP response data packet from a destination host corresponding to an HTTP request data packet in the HTTP request data packet set.

Specifically, HTTP request data packets in the HTTP request data packet set are respectively sent to destination hosts to obtain corresponding HTTP response data packets, and the HTTP request data packets and the HTTP response data packets are classified according to a source IP address and a destination IP address, that is, HTTP request data packets sent to a same destination host and HTTP response data packets returned from the same destination host are classified into a category.

Step 303. Extract first header information of the HTTP request data packet and second header information of the HTTP response data packet.

Specifically, the first header information includes a timestamp of the data packet, a Referer field of the data packet, and a size of the data packet; and the second header information includes a Content-type field of the data packet and a quantity of objects included in a web page file.

Step 304. Identify a non-junk information request data packet in the HTTP request data packet according to the first header information and the second header information.

Specifically, the filtering apparatus determines, according to the first header information of the HTTP request data packet and the second header information of the corresponding HTTP response data packet, whether a to-be-identified HTTP request data packet is a non-junk information request data packet. An identifying method may be used for determining according to the following five aspects: (1) determining, according to the Content-type field of the response data packet returned for the to-be-identified HTTP request data packet, that a web page format is any one of text, html, xml, and xhtml; (2) determining, according to a response data packet returned for the to-be-identified HTTP request data packet, that the quantity of web page objects is greater than three; (3) a time interval between a timestamp of the to-be-identified HTTP request data packet and a timestamp of the first data packet is longer than a preset duration; (4) a size of the to-be-identified HTTP request data packet is greater than a preset V (for example, V=5000 bytes); and (5) a Referer field of the to-be-identified HTTP request data packet is empty.

In the present invention, the filtering apparatus sets different filtering conditions according to different filtering levels. More dimensions that a to-be-identified HTTP request data packet meets indicate a greater possibility that the to-be-identified HTTP request data packet is a non-junk information request data packet. The filtering apparatus may adjust a dimension of classification according to a requirement. For example, in a scenario of high-level filtering, a to-be-identified HTTP request data packet is regarded as a non-junk information request data packet only when the to-be-identified HTTP request data packet meets all the five dimensions completely; in a scenario of middle-level filtering, a to-be-identified HTTP request data packet is regarded as a junk information request data packet when the to-be-identified HTTP request data packet meets four dimensions.

Step 305. Segregate a junk information request data packet from the HTTP request data packet according to the non-junk information request data packet.

Specifically, segregation processing is performed according to each non-junk information request data packet identified in the HTTP request data packet set in step 305, to obtain the junk information request data packet in the HTTP request data packet set.

Step 306. Prevent, according to a preset interception policy, a destination host corresponding to the junk information request data packet from returning a junk information response data packet to the client.

Specifically, the filtering apparatus identifies the junk information request data packet in the HTTP request data packet set, analyses a Host field in the junk information request data packet, and prevents, according to the preset interception policy, the host corresponding to the Host field from returning the responded junk information response data packet to the client. Information, such as a priority of the user and network traffic consumed by the user, may be taken into consideration in the preset interception policy; and real-time interception is performed only on a high-priority user and/or a user consuming relatively large network traffic.

In this embodiment of the present invention, the filtering apparatus may further acquire a hardware resource consumption value of the client; for example, the hardware resource consumption value includes CPU usage and memory usage. When the hardware resource consumption value of the client is greater than a specified value, the filtering apparatus performs interception; otherwise, the filtering apparatus performs no interception.

Figure 4:
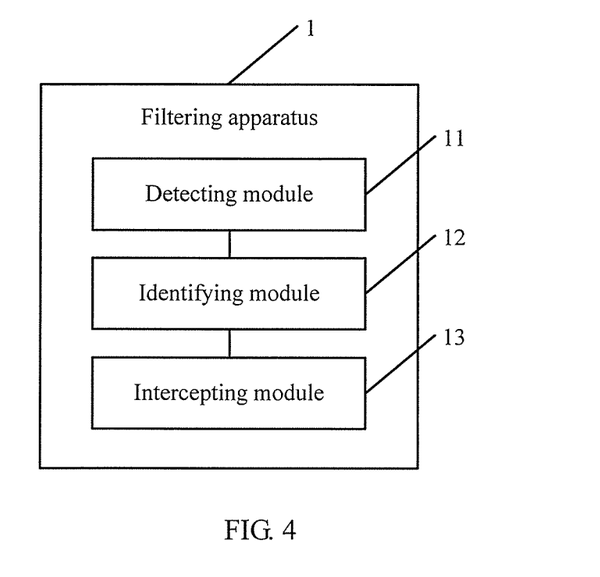
FIG. 4 is a schematic structural diagram of a junk information filtering apparatus according to an embodiment of the present invention.

Referring to FIG. 4, FIG. 4 is a schematic structural diagram of a junk information filtering apparatus according to an embodiment of the present invention, where the junk information filtering apparatus is hereinafter referred to as filtering apparatus 1. The filtering apparatus 1 includes a detecting module 11, an identifying module 12, and an intercepting module 13.

The detecting module 11 is configured to detect an Hypertext Transfer Protocol (HTTP) request data packet set generated according to that a user visits a target uniform resource locator (URL) by using a browser of a client, where the HTTP request data packet set includes at least one junk information request data packet and at least one non-junk information request data packet.

Specifically, the user clicks the target URL on a web page displayed on the browser of the client, or directly enters the target URL in an address bar of the browser; the client generates, at a time, the HTTP request data packet set that includes several data packets; and the detecting module 11 receives the HTTP request data packet set, where the HTTP request data packet set includes the at least one junk information request data packet and the at least one non-junk information request data packet, an HTTP request data packet sent to a destination host corresponding to the target URL is the non-junk information request data packet, and an HTTP request data packet sent to a destination host used to push junk information content is the junk information request data packet. For example, the user clicks a target URL "cnn.com", and the client generates an HTTP request data packet set, where the HTTP request data packet set includes a non-junk information request data packet sent to a destination host corresponding to the target URL cnn.com, and also includes a junk information request data packet sent to a host corresponding to "ads.cnn.com/id=210", a junk information request data packet sent to a host corresponding to "Google-analy/utm.gif", and a junk information request data packet sent to a junk information server corresponding to "ad.doubleclick.net/moij".

In this embodiment of the present invention, the filtering apparatus 1 is deployed between the client and a web page server or between the client and a junk information server; for example, the filtering apparatus 1 is deployed in a server of a carrier providing a network access server. The filtering apparatus 1 caches and parses the HTTP request data packet set sent by the client and an HTTP response data packet set responded by the web page server.

According to this embodiment of the present invention, a junk information request data packet in an HTTP request data packet set generated by a client is identified according to a preset rule; and a destination host corresponding to the identified junk information request data packet is prevented from returning a junk information response data packet to the client. A junk information request is identified at a data packet level, which can identify and intercept the junk information request more accurately, and prevent a junk information response from being generated by the junk information request and sent to the client, thereby effectively saving user traffic.

The identifying module 12 is configured to identify the junk information request data packet in the HTTP request data packet set according to a preset classification rule.

Specifically, the identifying module 12 parses header information of each to-be-identified HTTP request data packet in the HTTP request data packet set, where the header information includes a timestamp of the HTTP request data packet, a Referer field of the HTTP request data packet, and a size of the HTTP request data packet; performs a comparison according to the header information and the preset classification rule; and if the header information of the to-be-identified HTTP request data packet meets the preset classification rule, determines that the to-be-identified HTTP request data packet is the junk information request data packet. Specific implementation is that a classification rule can be implemented by using a regular expression, where a classification condition based on a related parameter of header information is set in the regular expression; and whether a to-be-identified HTTP request data packet is a junk information request data packet is determined by determining whether header information of the to-be-identified HTTP request data packet meets the regular expression.

The intercepting module 13 is configured to prevent, according to a preset interception policy, a destination host corresponding to the junk information request data packet from returning a junk information response data packet to the client.

Specifically, the identifying module 12 identifies the junk information request data packet in the HTTP request data packet set, and analyses a Host field in the junk information request data packet; and the intercepting module 13 prevents, according to the preset interception policy, the host corresponding to the Host field from returning the responded junk information response data packet to the client. Information, such as a priority of the user and network traffic consumed by the user, may be taken into consideration in the preset interception policy; and real-time interception is performed only on a high-priority user and/or a user consuming relatively large network traffic.

In this embodiment of the present invention, the intercepting module 13 may further acquire a hardware resource consumption value of the client; for example, the hardware resource consumption value includes CPU usage and memory usage. When the hardware resource consumption value of the client is greater than a specified value, the filtering apparatus performs interception; otherwise, the filtering apparatus performs no interception.

Figure 5:
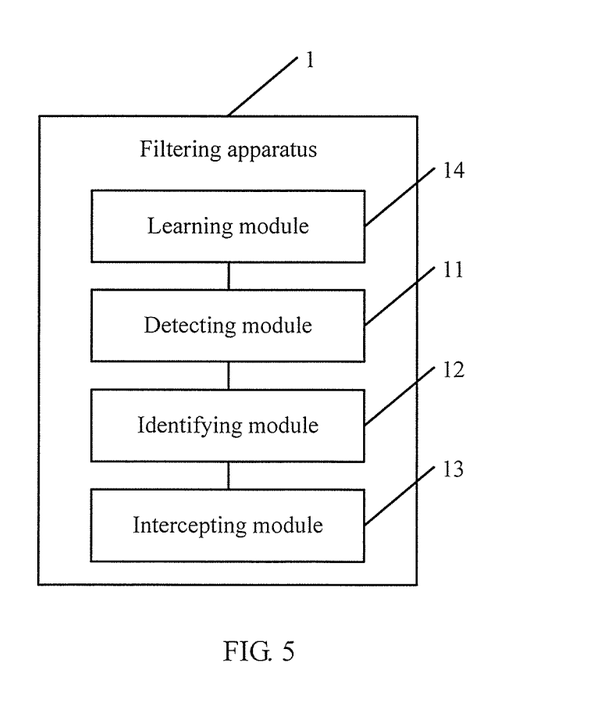
FIG. 5 is another schematic structural diagram of a junk information filtering apparatus according to an embodiment of the present invention.

Further, referring to FIG. 5 to FIG. 8, FIG. 5 is another schematic structural diagram of a junk information filtering apparatus according to an embodiment of the present invention. In addition to the detecting module 11, the identifying module 12, and the intercepting module 13, the filtering apparatus further includes:

a learning module 14, configured to: receive a training data packet that is sent by the client and carries junk information content, and generate, by learning the training data packet, the classification rule used to identify a junk information request data packet.

Figure 6:
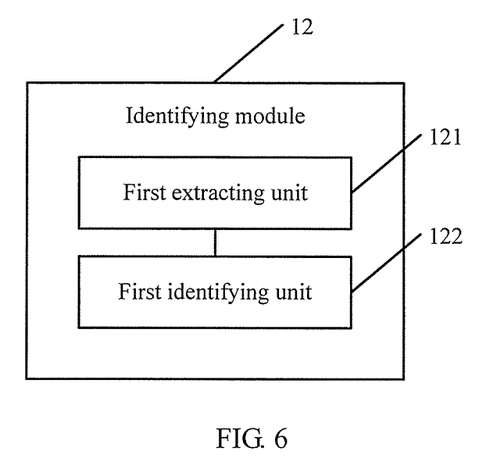
FIG. 6 is a schematic structural diagram of an identifying module in FIG. 5.

Preferably, in some embodiments of the present invention, the identifying module 12 includes:

a first extracting unit 121, configured to extract header information of a to-be-identified HTTP request data packet in the HTTP request data packet set, where the header information includes a timestamp of the HTTP request data packet, a size of the HTTP request data packet, and a Referer field of the HTTP request data packet; and a first identifying unit 122, configured to: if it is determined, according to the header information, that the to-be-identified HTTP request data packet meets the preset classification rule, determine that the to-be-identified HTTP request data packet is the junk information request data packet, where the preset classification rule includes that:

a time interval between the timestamp of the to-be-identified HTTP request data packet and a timestamp of the first HTTP request data packet is shorter than a preset duration; and/or the Referer field of the to-be-identified HTTP request data packet includes one or more of ad, widget, embed, banner, and blog; and/or the size of the to-be-identified HTTP request data packet is larger than a preset size.

Figure 7:
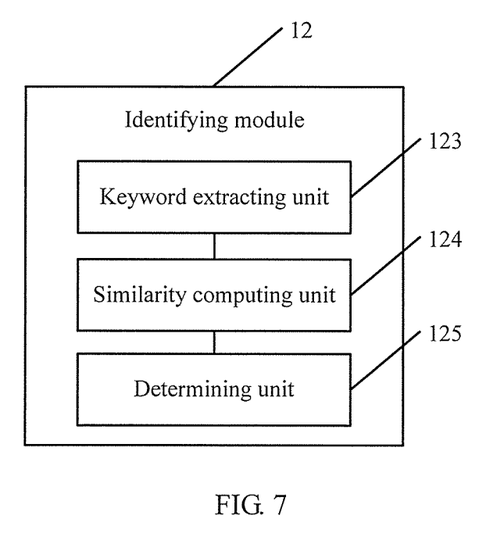
FIG. 7 is another schematic structural diagram of an identifying module in FIG. 5.

Preferably, in some embodiments of the present invention, the identifying module 12 includes:

a keyword extracting unit 123, configured to compute, according to a preset keyword extraction algorithm, a first keyword vector representing content of a to-be-identified HTTP request data packet in the HTTP request data packet set;

a similarity computing unit 124, configured to compute similarity between the first keyword vector and a second keyword vector that is generated according to a historical junk information request data packet of the user; and a determining unit 125, configured to: if a value of the similarity is less than a preset value, determine that the to-be-identified HTTP request data packet is the junk information request data packet.

Figure 8:
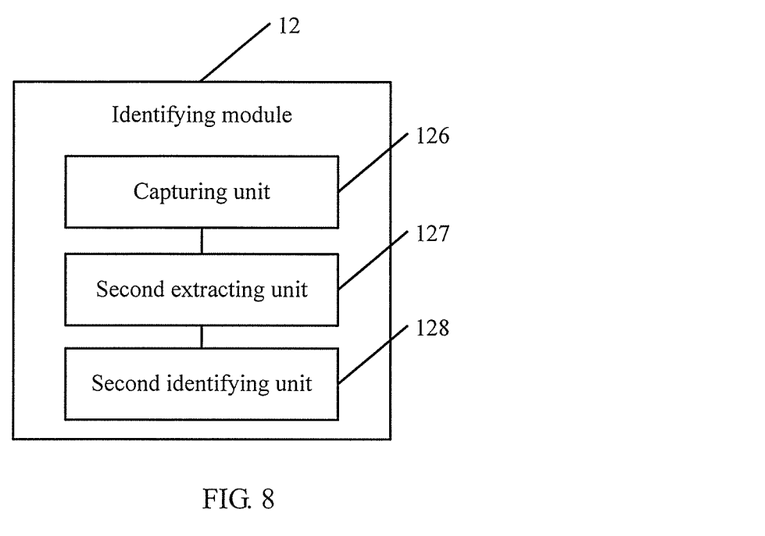
FIG. 8 is still another schematic structural diagram of an identifying module in FIG. 5.

Further, in some embodiments of the present invention, the identifying module 12 is specifically configured to: identify the non-junk information request data packet in the HTTP request data packet set, and segregate the junk information request data packet from the HTTP request data packet set according to the non-junk information request data packet.

The identifying module 12 includes:

a capturing unit 126, configured to capture a corresponding HTTP response data packet from a destination host corresponding to an HTTP request data packet in the HTTP request data packet set;

a second extracting unit 127, configured to extract first header information of the HTTP request data packet and second header information of the HTTP response data packet, where the first header information includes a timestamp of the HTTP request data packet, a Referer field of the HTTP request data packet, and a size of the data packet; and the second header information includes a Content-type field of the HTTP response data packet and a quantity of objects included in a web page file; and a second identifying unit 128, configured to identify the non-junk information request data packet in the HTTP request data packet set according to the first header information and the second header information.

Figure 9:
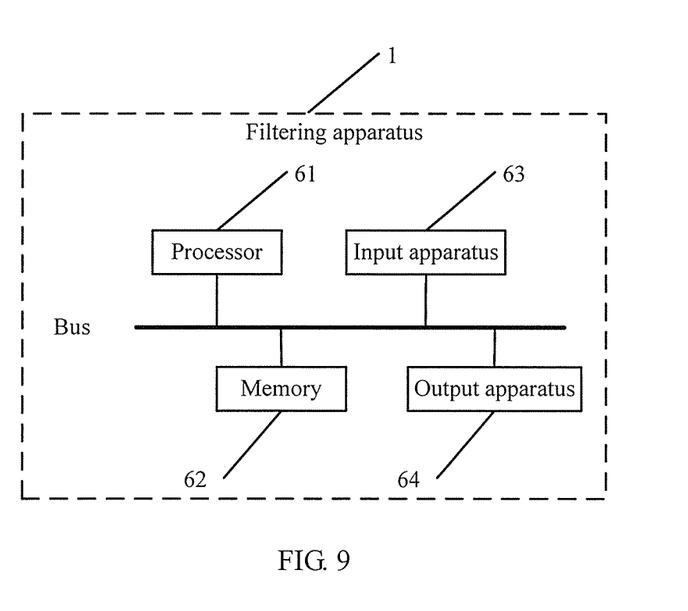
FIG. 9 is still another schematic structural diagram of a junk information filtering apparatus according to an embodiment of the present invention.

Referring to FIG. 9, FIG. 9 is still another schematic structural diagram of a junk information filtering apparatus according to an embodiment of the present invention, where the filtering apparatus 1 includes a processor 61, a memory 62, an input apparatus 63, and an output apparatus 64. There may be one or more processors 61 in the filtering apparatus 1, and one processor is used as an example in FIG. 9. In some embodiments of the present invention, the processor 61, the memory 62, the input apparatus 63, and the output apparatus 64 may be connected by using a bus or in another manner, and a bus connection is used as an example in FIG. 9.

The memory 62 stores a group of program code; and the processor 61 is configured to invoke the program code stored in the memory 62 to perform the following operations:

detecting an Hypertext Transfer Protocol (HTTP) request data packet set generated according to that a user visits a target uniform resource locator (URL) by using a browser of a client, where the HTTP request data packet set includes at least one junk information request data packet and at least one non-junk information request data packet;

identifying the junk information request data packet in the HTTP request data packet set according to a preset classification rule; and preventing, according to a preset interception policy, a destination host corresponding to the junk information request data packet from returning a junk information response data packet to the client.

In some embodiments of the present invention, the step, executed by the processor 61, of identifying the junk information request data packet in the request information data packet set according to a preset classification rule includes:

extracting header information of a to-be-identified HTTP request data packet in the HTTP request data packet set, where the header information includes a timestamp of the HTTP request data packet, a size of the HTTP request data packet, and a Referer field of the HTTP request data packet; and if it is determined, according to the header information, that the to-be-identified HTTP request data packet meets the preset classification rule, determining that the to-be-identified HTTP request data packet is the junk information request data packet, where the preset classification rule includes that:

a time interval between the timestamp of the to-be-identified HTTP request data packet and a timestamp of the first HTTP request data packet is shorter than a preset duration; and/or the Referer field of the to-be-identified HTTP request data packet includes one or more of ad, widget, embed, banner, and blog; and/or the size of the to-be-identified HTTP request data packet is larger than a preset size.

In some embodiments of the present invention, the step, executed by the processor 61, of identifying the junk information request data packet in the request information data packet set according to a preset classification rule includes:

computing, according to a preset keyword extraction algorithm, a first keyword vector representing content of a to-be-identified HTTP request data packet in the HTTP request data packet set;

computing similarity between the first keyword vector and a second keyword vector that is generated according to a historical junk information request data packet of the user; and if a value of the similarity is less than a preset value, determining that the to-be-identified HTTP request data packet is the junk information request data packet.

In some embodiments of the present invention, the processor 61 is further configured to: receive a training data packet that is sent by the client and carries junk information content, and generate, by learning the training data packet, the classification rule used to identify a junk information request data packet.

In some embodiments of the present invention, the step, executed by the processor 61, of identifying the junk information request data packet in the HTTP request data packet set according to a preset classification rule includes:

identifying the non-junk information request data packet in the HTTP request data packet set, and segregating the junk information request data packet from the HTTP request data packet set according to the non-junk information request data packet.

In some embodiments of the present invention, the step, executed by the processor 61, of identifying the junk information request data packet in the HTTP request data packet set includes:

capturing a corresponding HTTP response data packet from a destination host corresponding to an HTTP request data packet in the HTTP request data packet set;

extracting first header information of the HTTP request data packet and second header information of the HTTP response data packet, where the first header information includes a timestamp of the HTTP request data packet, a Referer field of the HTTP request data packet, and a size of the data packet; and the second header information includes a Content-type field of the HTTP response data packet and a quantity of objects included in a web page file; and identifying the non-junk information request data packet in the HTTP request data packet set according to the first header information and the second header information.

In some embodiments of the present invention, the step, executed by the processor 61, of preventing, according to a preset interception policy, a destination host corresponding to the junk information request data packet from returning a junk information response data packet to the client includes:

if traffic consumed by the user is larger than preset traffic and/or a priority of the user is higher than a preset priority, intercepting the junk information response data packet returned to the client by the destination host corresponding to the junk information request data packet.

According to this embodiment of the present invention, a junk information request data packet in an HTTP request data packet set generated by a client is identified according to a preset rule; and a destination host corresponding to the identified junk information request data packet is prevented from returning a junk information response data packet to the client. A junk information request is identified at a data packet level, which can identify and intercept the junk information request more accurately, and prevent a junk information response from being generated by the junk information request and sent to the client, thereby effectively saving user traffic.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (ROM), or a random access memory (RAM).

What is disclosed above is merely exemplary embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A junk information filtering method, comprising:

detecting an Hypertext Transfer Protocol (HTTP) request data packet set generated according to a user visit to a target uniform resource locator (URL) using a browser of a client, wherein the HTTP request data packet set comprises at least one junk information request data packet and at least one non-junk information request data packet;

identifying the junk information request data packet in the HTTP request data packet set according to a preset classification rule, by:
   extracting header information of a to-be-identified HTTP request data packet in the HTTP request data packet set, wherein the header information comprises a timestamp of the to-be-identified HTTP request data packet, a size of the to-be-identified HTTP request data packet, and a Referer field of the to-be-identified HTTP request data packet; and
   when it is determined, according to the header information, that the to-be-identified HTTP request data packet meets the preset classification rule, determining that the to-be-identified HTTP request data packet is the junk information request data packet, wherein the preset classification rule comprises at least one of the following:
     a time interval between the timestamp of the to-be-identified HTTP request data packet and a timestamp of the first HTTP request data packet is shorter than a preset duration,
     the Referer field of the to-be-identified HTTP request data packet comprises one or more of ad, widget, embed, banner, and blog, and
     the size of the to-be-identified HTTP request data packet is larger than a preset size; and
   preventing, according to a preset interception policy, a destination host corresponding to the junk information request data packet from returning a junk information response data packet to the client.

2. The method according to claim 1, wherein before detecting an Hypertext Transfer Protocol (HTTP) request data packet set generated according to that a user visits a target uniform resource locator (URL) by using a browser of a client, the method comprises:
   receiving a training data packet that is sent by the client and carries junk information content, and generating, by learning the training data packet, the classification rule used to identify a junk information request data packet.

3. The method according to claim 1, wherein identifying the junk information request data packet in the HTTP request data packet set according to a preset classification rule comprises:
   identifying the non junk information request data packet in the HTTP request data packet set, and segregating the junk information request data packet from the HTTP request data packet set according to the non-junk information request data packet.

4. The method according to claim 3, wherein identifying the non junk information request data packet in the HTTP request data packet set comprises:
   capturing a corresponding HTTP response data packet from a destination host corresponding to an HTTP request data packet in the HTTP request data packet set;
   extracting first header information of the HTTP request data packet and second header information of the HTTP response data packet, wherein the first header information comprises a timestamp of the HTTP request data packet, a Referer field of the HTTP request data packet, and a size of the HTTP request data packet, and wherein the second header information comprises a Content-type field of the HTTP response data packet and a quantity of objects comprised in a web page file; and
   identifying the non-junk information request data packet in the HTTP request data packet set according to the first header information and the second header information.

5. The method according to claim 1, wherein preventing, according to a preset interception policy, a destination host corresponding to the junk information request data packet from returning a junk information response data packet to the client comprises:
   if traffic consumed by the user is larger than preset traffic and/or a priority of the user is higher than a preset priority, intercepting the junk information response data packet returned to the client by the destination host corresponding to the junk information request data packet.

6. A junk information filtering method, comprising:
   detecting an Hypertext Transfer Protocol (HTTP) request data packet set generated according to a user visit to a target uniform resource locator (URL) using a browser of a client, wherein the HTTP request data packet set comprises at least one junk information request data packet and at least one non junk information request data packet;
   identifying the junk information request data packet in the HTTP request data packet set according to a preset classification rule by:
     computing, according to a preset keyword extraction algorithm, a first keyword vector representing content of a to-be-identified HTTP request data packet in the HTTP request data packet set;
     computing similarity between the first keyword vector and a second keyword vector that is generated according to a historical junk information request data packet of the user; and
     when a value of the similarity is less than a preset value, determining that the to-be-identified HTTP request data packet is the junk information request data packet; and
   preventing, according to a preset interception policy, a destination host corresponding to the junk information request data packet from returning a junk information response data packet to the client.

7. A junk information filtering apparatus, comprising:
a memory; and
a processor in communication with the memory, wherein the processor is configured to:
   detect an Hypertext Transfer Protocol (HTTP) request data packet set generated according to a user visit to a target uniform resource locator (URL) by using a browser of a client, wherein the HTTP request data packet set comprises at least one junk information request data packet and at least one non junk information request data packet;
   extract header information of a to-be-identified HTTP request data packet in the HTTP request data packet set, wherein the header information comprises a timestamp of the to-be-identified HTTP request data packet, a size of the to-be-identified HTTP request data packet, and a Referer field of the to-be-identified HTTP request data packet;
   when it is determined, according to the header information, that the to-be-identified HTTP request data packet meets the preset classification rule, determine that the to-be-identified HTTP request data packet is the junk information request data packet, wherein the preset classification rule comprises at least one of the following:

a time interval between the timestamp of the to-be-identified HTTP request data packet and a timestamp of the first HTTP request data packet is shorter than a preset duration, the Referer field of the to-be-identified HTTP request data packet comprises one or more of ad, widget, embed, banner, and blog, and the size of the to-be-identified HTTP request data packet is larger than a preset size; and prevent, according to a preset interception policy, a destination host corresponding to the junk information request data packet from returning a junk information response data packet to the client.

8. The apparatus according to claim 7, wherein the processor is further configured to:

receive a training data packet that is sent by the client and carries junk information content; and generate, by learning the training data packet, the classification rule used to identify a junk information request data packet.

9. The apparatus according to claim 7, wherein the processor is further configured to:

identify the non junk information request data packet in the HTTP request data packet set; and segregate the junk information request data packet from the HTTP request data packet set according to the non junk information request data packet.

10. The apparatus according to claim 9, wherein the processor is further configured to:

capture a corresponding HTTP response data packet from a destination host corresponding to an HTTP request data packet in the HTTP request data packet set;

extract first header information of the HTTP request data packet and second header information of the HTTP response data packet, wherein the first header information comprises a timestamp of the HTTP request data packet, a Referer field of the HTTP request data packet, and a size of the HTTP request data packet and the second header information comprises a Content-type field of the HTTP response data packet and a quantity of objects comprised in a web page file; and identify the non junk information request data packet in the HTTP request data packet set according to the first header information and the second header information.

11. The apparatus according to claim 7, wherein the processor is further configured to:

when traffic consumed by the user is larger than preset traffic and/or a priority of the user is higher than a preset priority, intercept the junk information response data packet returned to the client by the destination host corresponding to the junk information request data packet.

12. A junk information filtering apparatus, comprising:

a memory; and a processor in communication with the memory, wherein the processor is configured to:

detect an Hypertext Transfer Protocol (HTTP) request data packet set generated according to a user visit to a target uniform resource locator (URL) by using a browser of a client, wherein the HTTP request data packet set comprises at least one junk information request data packet and at least one non-junk information request data packet;

compute, according to a preset keyword extraction algorithm, a first keyword vector representing content of a to-be-identified HTTP request data packet in the HTTP request data packet set;

compute similarity between the first keyword vector and a second keyword vector that is generated according to a historical junk information request data packet of the user;

when a value of the similarity is less than a preset value, determine that the to-be-identified HTTP request data packet is the junk information request data packet; and prevent, according to a preset interception policy, a destination host corresponding to the junk information request data packet from returning a junk information response data packet to the client.

* * * * *